(12) United States Patent
Shi (10) Patent No.: US 7,184,237 B2
(45) Date of Patent: Feb. 27, 2007

(54) METHOD AND APPARATUS FOR SELECTING EQUALIZATION TARGETS

(75) Inventor: Tong Shi, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 791 days.

(21) Appl. No.: 10/028,067

(22) Filed: Dec. 21, 2001

(65) Prior Publication Data

US 2003/0039049 A1   Feb. 27, 2003

Related U.S. Application Data

(60) Provisional application No. 60/313,914, filed on Aug. 21, 2001.

(51) Int. Cl.
*G11B 5/035* (2006.01)
(52) U.S. Cl. .................................... 360/65
(58) Field of Classification Search ............ 360/65, 360/31, 46; 375/262, 232, 229, 231, 341, 375/350; 714/794, 795, 796, 800, 799, 769, 714/770
See application file for complete search history.

(56) References Cited

U.S. PATENT DOCUMENTS

| 4,888,779 | A | * | 12/1989 | Karabed et al. ............ 714/794 |
| 5,128,811 | A | * | 7/1992 | Van Gestel .................. 360/46 |
| 5,287,385 | A | | 2/1994 | Sugawara et al. ........... 375/12 |
| 5,400,189 | A | | 3/1995 | Sato et al. ..................... 360/65 |
| 5,539,588 | A | * | 7/1996 | Sawaguchi et al. ........... 360/46 |
| 5,541,956 | A | | 7/1996 | Ueda ........................... 375/232 |
| 6,052,349 | A | | 4/2000 | Okamoto ..................... 369/59 |
| 6,105,159 | A | * | 8/2000 | Frederickson ............... 714/792 |
| 6,122,120 | A | * | 9/2000 | Shimoda ....................... 360/65 |
| 6,216,249 | B1 | * | 4/2001 | Bliss et al. ................. 714/796 |
| 6,243,847 | B1 | * | 6/2001 | McClellan et al. ......... 714/800 |
| 6,249,398 | B1 | * | 6/2001 | Fisher et al. .................. 360/65 |
| 6,285,520 | B1 | * | 9/2001 | Makiura et al. .............. 360/65 |
| 6,377,635 | B1 | * | 4/2002 | Cideciyan et al. .......... 375/341 |
| 6,385,239 | B1 | * | 5/2002 | Okamoto et al. ........... 375/232 |
| 6,477,125 | B1 | * | 11/2002 | Hayami .................... 369/59.22 |
| 6,501,610 | B1 | * | 12/2002 | Sugawara et al. ............ 360/65 |
| 6,546,518 | B1 | * | 4/2003 | Leung et al. .................. 360/53 |
| 6,732,328 | B1 | * | 5/2004 | McEwen et al. ............ 714/795 |

(Continued)

FOREIGN PATENT DOCUMENTS

EP       0 622 798 A2   4/1994

(Continued)

OTHER PUBLICATIONS

NA 9404493, IBM Technical Disclosure Bulletin, Apr. 1994, US, vol. 37, Issue No. 4A, pp. 493-494.*

(Continued)

*Primary Examiner*—Andrea Wellington
*Assistant Examiner*—Glenda P. Rodriguez
(74) *Attorney, Agent, or Firm*—Theodore M. Magee; Westman, Champlin & Kelly, P.A.

(57) ABSTRACT

A method is provided for identifying an equalization target for a channel. The method includes measuring a goodness metric for first and second candidate equalization targets and selecting the candidate equalization target with the best measure of the goodness metric as the equalization target for the channel.

19 Claims, 6 Drawing Sheets

U.S. PATENT DOCUMENTS 6,785,212 B1 * 8/2004 Sim et al. ................. 369/59.22
2002/0101674 A1 * 8/2002 Ichihara et al. ............... 360/60

FOREIGN PATENT DOCUMENTS

EP 622798 A2 * 11/1994
JP 08212716 A * 8/1996
WO WO 00/46802 8/2000

OTHER PUBLICATIONS

"A 110 MHz 350 mW 0.6 um CMOS 16-State Generalized-Target Viterbi Detector for Disk Drive Read Channels" by Sridharan et al., IEEE Transactions on Solid-State Circuits, vol. 35, No. 3, Mar. 2000, pp. 362-370.*

"Multi-level Decision Feedback Equalization: An Efficient Realization of FDTS/DF" by Kenney et al., IEEE Transactions on Magnetics, vol. 31, No. 2, Mar. 1995, pp. 1115-1120.*

"A 200-MSample/s Trellis-Coded PRML Read/Write CHannel with Analog Adaptive Equalizer and Digital Servo" by Alini et al., IEEE Journal of Solid-State Circuits, vol. 22, No. 11, Nov. 1997, pp. 1824-1838.*

"Adaptive Equalization" by Proakis, "Digital Communications", Third Edition, pp. 637-674.*

"Spectral Content of NRZ Test Patterns", http://pdserv.maxim-ic.com/en/an/AN3455.pdf, found in Google.*

"Spectral Null Codes" by K.A. Schouhamer, IEEE Transactions on Magnetics, vol. 26, No. 2, Mar. 1990, pp. 1130-1135.*

"Matched Spectral-Null Codes for Partial Response Channels" by Karabed et al., IEEE Transactions on Information Theory, vol. 37, No. 3, May 1991, pp. 818-855.*

Sugawara et al., "Viterbi Detector Including PRML and EPRML," IEEE Transaction on Magnetics, vol. 29, No. 6, Nov. 1993.

* cited by examiner

METHOD AND APPARATUS FOR SELECTING EQUALIZATION TARGETS

CROSS-REFERENCE TO RELATED APPLICATION

This application claims priority from U.S. Provisional Application 60/313,914 filed on Aug. 21, 2001 for inventor Tong Shi and entitled RECORDING CHANNEL EQUALIZATION TARGET ALGORITHM.

FIELD OF THE INVENTION

The present invention relates generally to signal equalization, and more particularly but not by limitation to equalization targets for signals.

BACKGROUND OF THE INVENTION

In mass data storage devices, data stored on a magnetic or optical medium are read by a head that moves relative to the medium. The head generates an analog signal based on the stored data. Because of the density of the data stored on the medium, the value of the read signal at any point in time is the product of a number of stored data values, not just the data value associated with the current time point. Thus, the current value of the analog signal is a function of data values read from the medium before, at and even after the current time point. This function is known as the channel response of the data storage device.

In the prior art, the read signal was conditioned by an equalizer so that the equalized read signal fits a desired function, known as a target. Such functions are typically described using the delay operator D where D is raised to a power to indicate the time point of a data value. Thus, D indicates the preceding data value, $D^2$ indicates the second preceding value, $D^3$ indicates the third preceding value, and so forth. Examples of prior art targets include the PR4 target defined as $(1-D)(1+D)$, the EPR4 target defined as $(1-D)(1+2D+D^2)$ and the $E^2PR4$ target defined as $(1-D)(1+3D+3D^2+D^3)$.

In the past, equalization targets have generally been selected based on their spectral properties and their correspondence to the natural channel response of the storage device. Although these factors provide some criteria for selecting from the unlimited number of possible targets, they do not ensure that the target will provide the best results. Thus, a better method is needed for identifying an equalization target.

Embodiments of the present invention provide solutions to these and other problems, and offer other advantages over the prior art.

SUMMARY OF THE INVENTION

A method is provided for identifying an equalization target for a channel. The method includes measuring a goodness metric for at least first and second candidate equalization targets and selecting the candidate equalization target with the best measure of the goodness metric as the equalization target for the channel.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
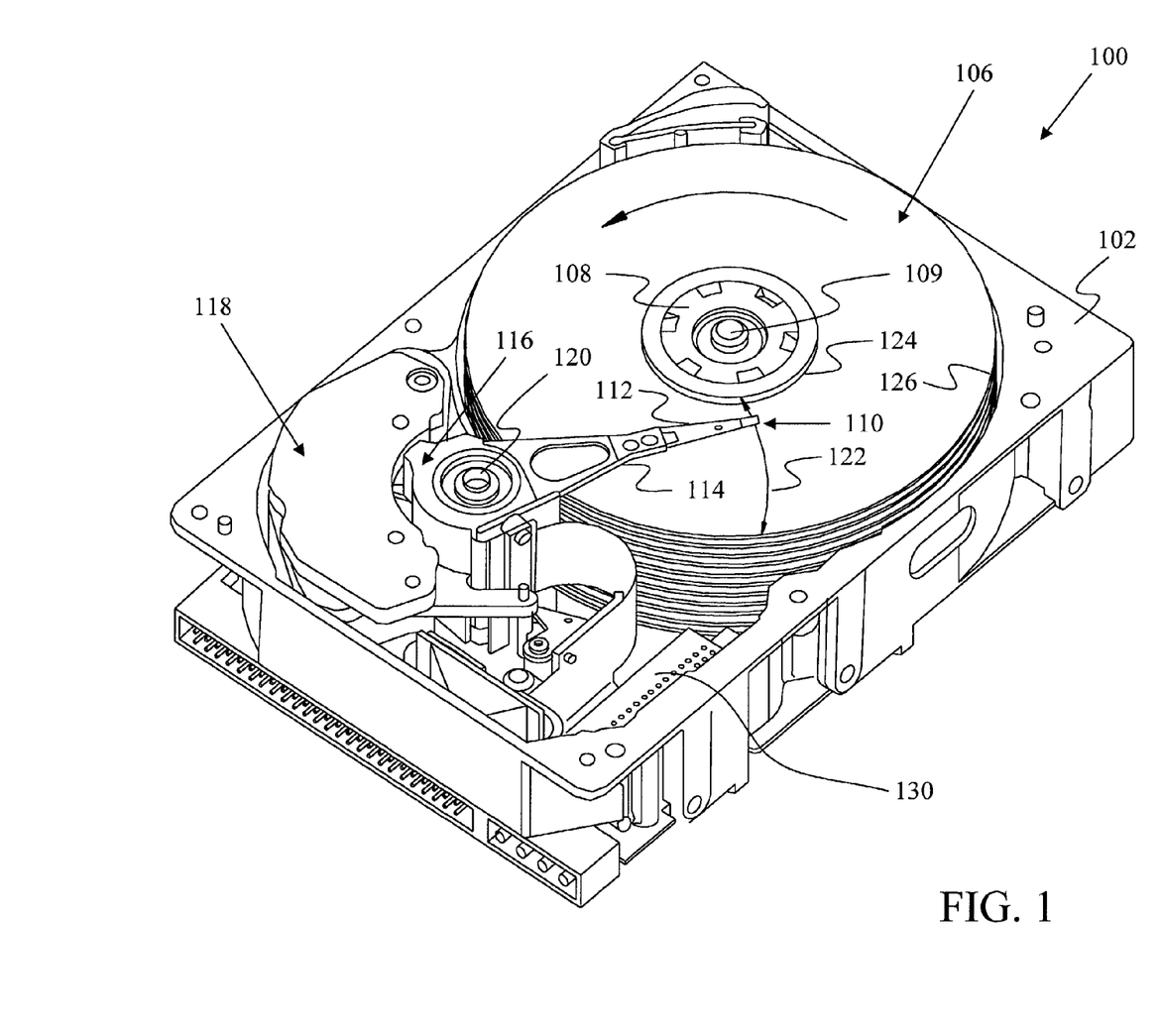
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
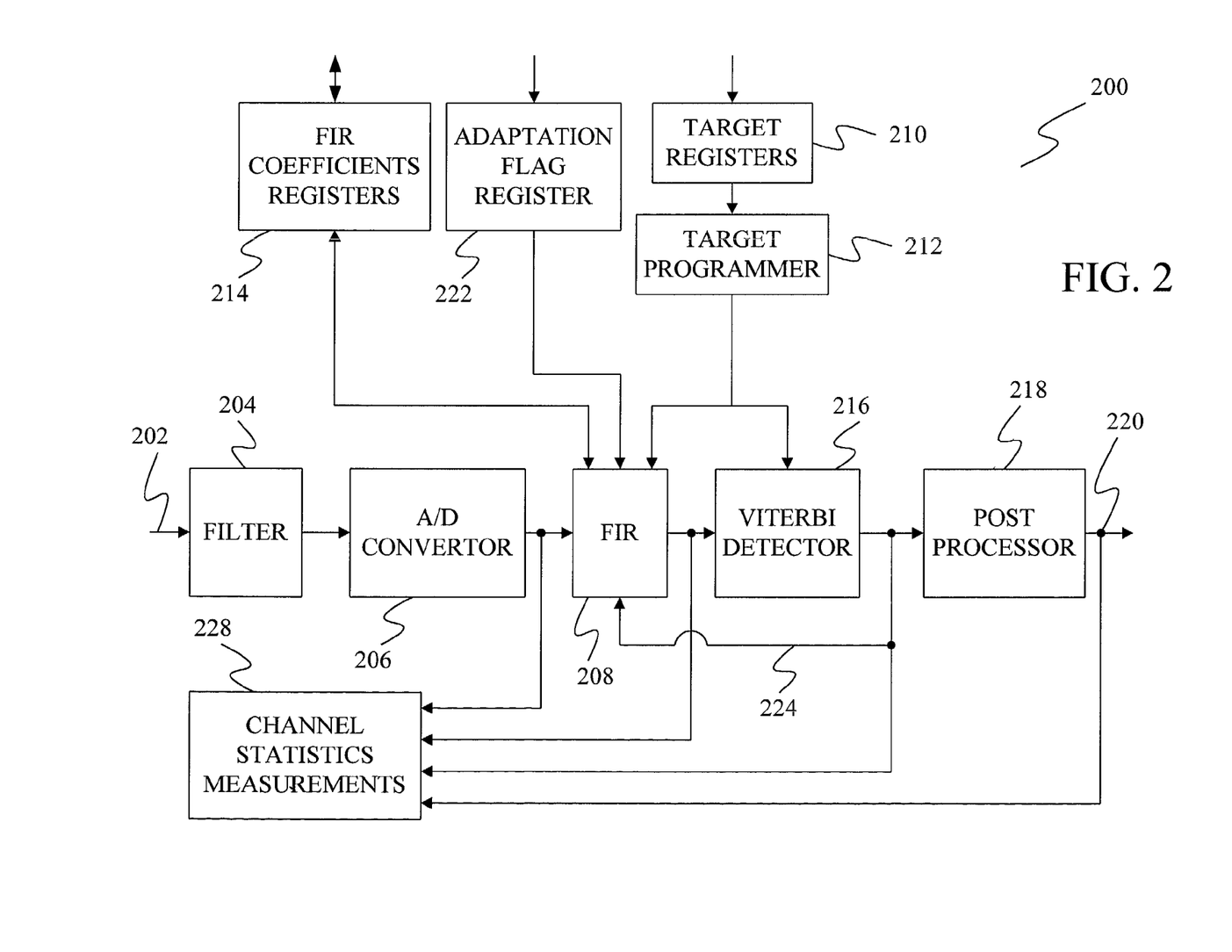
FIG. 2 is a block diagram of a channel in which embodiments of the present invention may be practiced.

FIG. 2 provides a block diagram of a read channel 200 in which some embodiments of the present invention are practiced. Read channel 200 receives an analog read signal 202 from a preamplifier, which amplifies the signal from a read head (not shown). Analog read signal 202 is filtered by a continuous time filter 204 to remove noise. The filtered read signal is then converted into a series of digital values by an analog-to-digital (A/D) convertor 206.

The digital values produced by A/D convertor 206 are supplied to a finite impulse response (FIR) filter 208, which modifies the values based on FIR tap coefficients stored in a register 214. The coefficients in register 214 are designed to shape the digital values toward an equalization target stored in target registers 210. Thus, the continuous time filter 204 and FIR filter 208 jointly accomplish the task of signal equalization.

The equalized digital values produced by FIR filter 208 are provided to a Viterbi Detector 216, which identifies data values from the equalized digital values based on the equalization target in target registers 210. The detected data values are provided to a post processor 218, which performs further parity error checking and correction to produce a final channel output 220.

Under one embodiment, the channel used with the present invention is the Marvell 88C5500 PRML read channel available from Marvell Semiconductor, Inc. of Sunnyvale, Calif. In this channel, the equalization target for the channel may be modified by changing the values in target registers 210. In particular, this read channel allows equalization targets of the form $(1-D)(T_0+T_1D+T_2D^2+T_3D^3)$ to be set by designating the values for equalization terms $T_0$, $T_1$, $T_2$, and $T_3$ in target registers 210. When these target terms are set, a target programmer 212 communicates the changes to Viterbi detector 216 and FIR filter 208.

Figure 3:
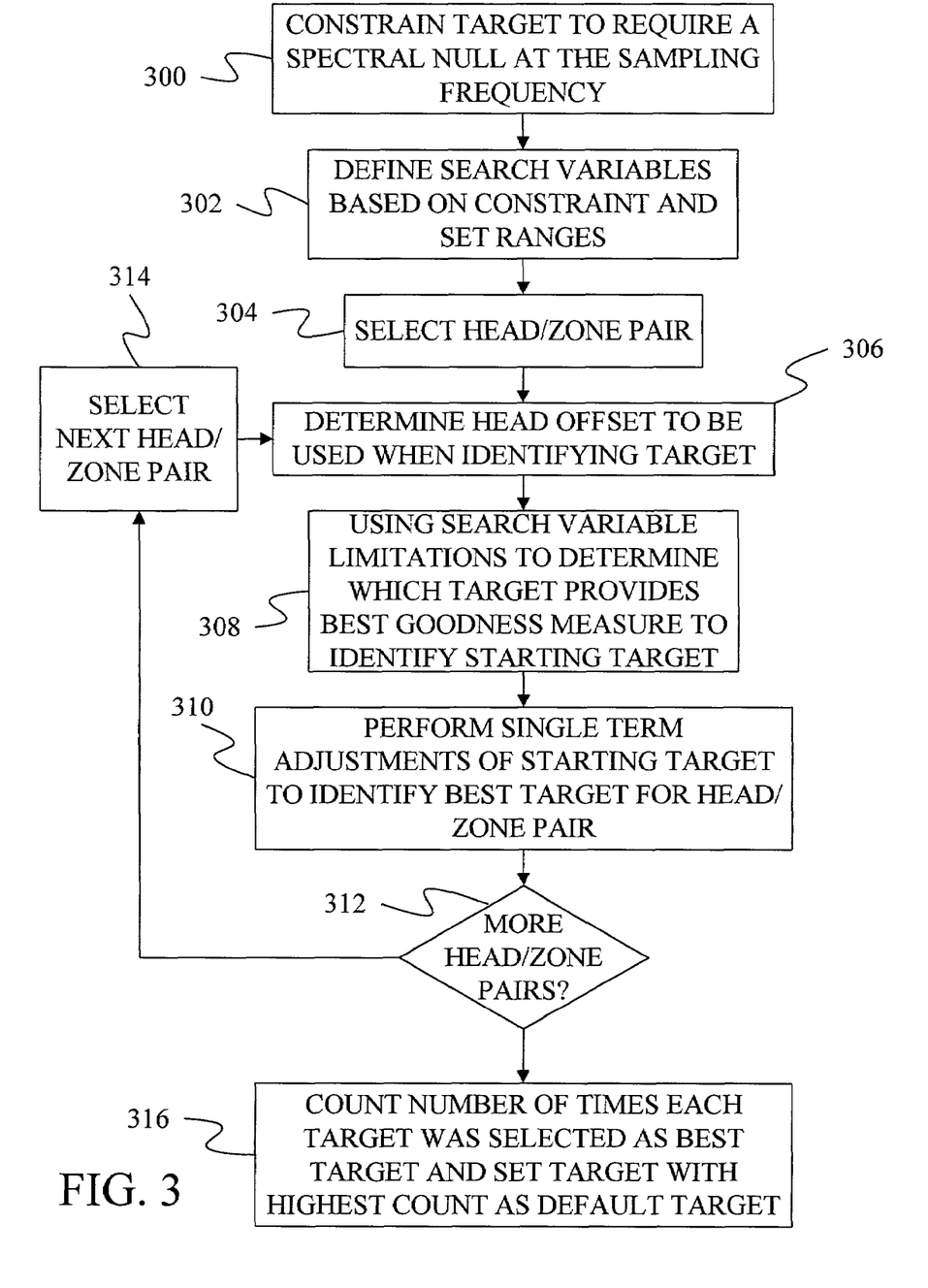
FIG. 3 is a flow diagram of a method for selecting a default equalization target.

Embodiments of the present invention provide a method for selecting an equalization target for a storage device. As shown in the flow diagram of FIG. 3, the method begins at step 300 where the choice of initial targets under consideration is constrained by requiring that the target have a spectral null at the sampling frequency. For a target of the form $(1-D)(T_0+T_1D+T_2D^2+T_3D^3)$ this constraint requires that:

$$T_0+T_2=T_1+T_3$$

Using this constraint, the target can be expressed in terms of a set of search variables $N_0$, $N_1$, and $N_2$ at step 302 as:

$$(1-D)(1+D)(N_0+N_1D+N_2D^2)$$

where:
$N_0=T_0$;
$N_1=T_1-N_0$; and
$N_2=T_2-N_1=T_3$.

To further help constrain the initial search, the search variables can be limited to having only certain values. In one particular embodiment, $N_0$ is limited to having integer values between 3 and 5, $N_1$ is limited to having integer values between 0 and 3, and $N_2$ is limited to having values between 0 and $N_1$.

After the constraints for the search variables have been set, a head or head/zone pair is selected at step 304. In this context, a zone is radial zone along a disc storage medium where all tracks in a zone have a common sampling frequency. Thus, the present invention allows a separate target to be identified for each head or each head/zone pair.

To determine which target provides better results for the storage device, some goodness metric must be determined for each target. Many embodiments of the present invention use the number of post-processor parity errors generated during a read operation as the measure of the goodness of a target where post-processor parity errors are errors that indicate that certain algebraic properties of a data segment produced by Viterbi detector 216 does not match the expected algebraic properties for the segment. (For example, an odd number of ones is expected but an even number of ones is received). Note that after being detected, most such parity errors are corrected by post processor 218 using error correction codes embedded within the data. Also note that post-processor parity errors are only one example of possible goodness metrics that can be used with the present invention. Other possible goodness metrics include the data error rate which is computed by comparing the final output data to the data originally stored on the medium and a detected data error rate that is computed by comparing the output of Viterbi detector 216 to an expected output that is based on the data stored on the medium.

In order for parity error metric to be accurate and efficient, an adequate number of parity errors must be generated during the read operation. Under one embodiment of the present invention, this is accomplished by moving the read head off track center to a point where there are enough parity errors to make the target search efficient. The determination of how far to move the head is shown as step 306 in FIG. 3 and is discussed in detail in the flow diagram of FIG. 4.

Figure 4:
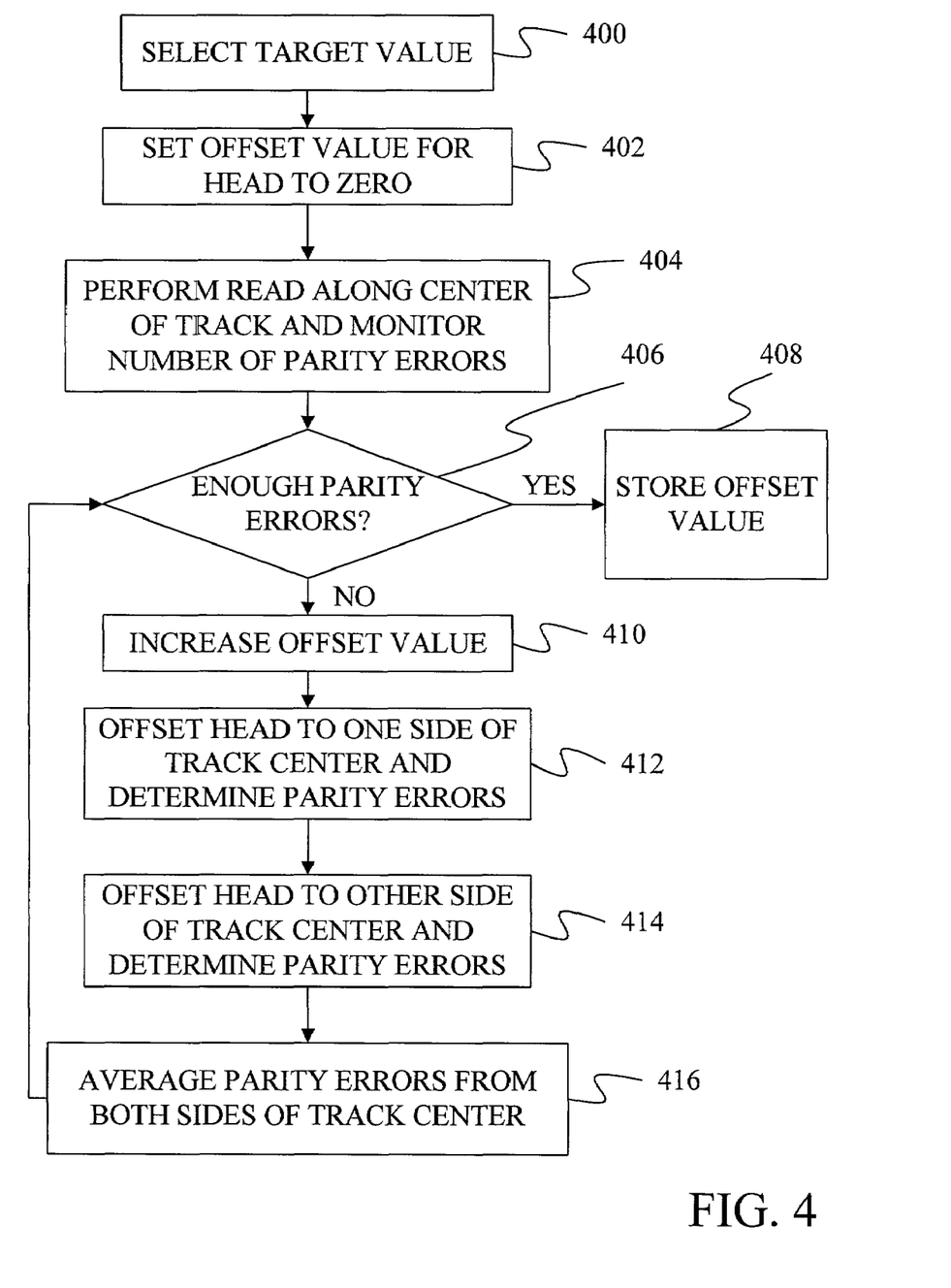
FIG. 4 is a flow diagram of a method of identifying a head offset to use when selecting an equalization target.

In step 400 of FIG. 4, an initial target value is selected and at step 402 the offset value for the head is set to zero. At step 404, a read operation is performed along the center of the track for a number of revolutions, typically four, while the number of parity errors is collected by a channel statistics measurement component 228. At step 406, the number of parity errors is examined to determine if it is statistically significant so as to make the method of identifying a target accurate and efficient. In many embodiments, collecting two hundred parity errors during the reading of seven thousand sectors is considered adequate for the target identification method of the present invention.

If there are not enough parity errors at step 306, the offset value for the head is increased at step 410. The head is then offset at step 412 to one side of track center by the amount designated by the offset value and a second read operation is performed to collect new parity error data. The head is then offset at step 414 to the opposite side of track center by the amount designated by the offset value and a third read operation is performed to collect additional parity error data. The numbers of parity errors from the two sides of track center are then averaged together at step 416. This average value is examined at step 406 to determine if the number of parity errors is adequate. If there are still too few parity errors, the offset value is increased again and steps 412, 414, and 416 are repeated. This cycle continues until the number of parity errors is adequate at step 406. At that point, the offset value is stored at step 408 so that it can be used when measuring the goodness metric for each candidate target.

Returning to FIG. 3, after the head offset has been determined at step 306, the best target that meets the search variable limitations is determined at step 308. The process of determining which target is best is shown in detail in the flow diagram of FIG. 5.

Figure 5:
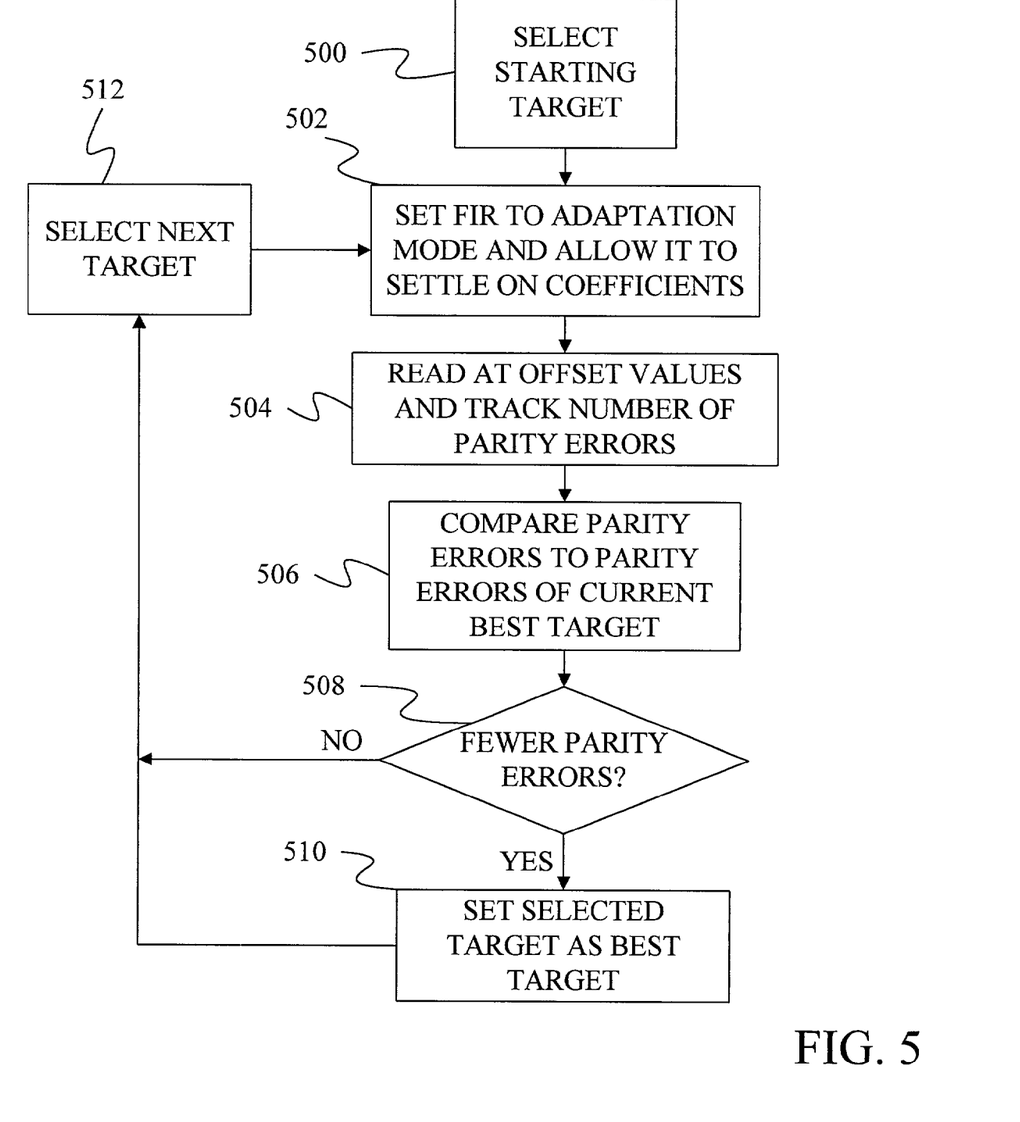
FIG. 5 is a flow diagram of a method of comparing equalization targets to select one target over another.

In step 500 of FIG. 5, an initial target that meets the limitations placed on the search variables is selected and is placed in target registers 210 of FIG. 2. At step 502, adaptation flag register 222 of FIG. 2 is set to place FIR filter 208 into an adaptation mode. In the adaptation mode, FIR filter 208 adjusts its tap coefficients in FIR coefficients register 214 until the FIR filter is able to equalize the data so that the equalization result matches the target stored in target registers 210. Such self-adapting FIR filters are well known in the art. In brief, they operate by measuring an error between the target equalization and the actual equalization, which is detected using a feedback path 224 extending from the output of Viterbi detector 216 to FIR filter 208.

Once the coefficients for FIR filter 208 have settled on a set of values, the adaptation flag is reset so that FIR filter 208 is no longer in adaptation mode. Then, at step 504, a read operation is performed using the stored head offset value identified in step 408 of FIG. 4. If the offset value is zero, a single read operation is performed along the track center and the number of parity errors detected during the read is recorded. If the offset value is not zero, the offset value is used to set the position of the head during two read operations. During one of the read operations, the head is moved to one side of track center by a distance equal to the offset value and during the other read operation the head is moved to the other side of track center by a distance equal to the offset value. The number of parity errors identified during these two offset read operations are averaged together.

At step 506, the number of parity errors determined during the read operations of step 504 is compared to the number of parity errors generated using the current best target. If no other targets have been tested before the present target, the present target is considered the current best target and this comparison is not performed. If the present target has fewer parity errors than the current best target at step 508, the present target is set as the new best target at step 510 and the next target to be tested is selected at step 512. If the present target does not have fewer parity errors than the current best target at step 508, the best target remains the same and the next target for testing is selected at step 512.

Steps 502, 504, 506, 508, 510, and 512, are repeated until all of the targets that meet the spectral null constraints of step 302 have been tested. At that point, the current best target is selected as the starting target for step 308.

After the starting target has been selected, the process of FIG. 3 continues at step 310 where the spectral null constraint is broken and the individual terms, $T_0$, $T_1$, $T_2$, and $T_3$, of the starting target are adjusted to identify a best target for the head or head/zone pair. In one particular embodiment, this involves adjusting the terms in the following order: $T_3$, $T_2$, $T_1$, $T_0$, $T_1$, $T_2$ and $T_3$. Each adjustment involves first increasing the term by 1 to see if the parity errors are reduced using the steps of FIG. 5. If the parity errors are reduced, further increases by 1 are tested to see if the target continues to improve. When an increase no longer results in an improvement, the previous value for the term is used in the target and the next term is selected for adjustment. If the initial increase in the term does not result in an improvement, the term is decreased by 1 to see if that results in fewer parity errors. If reducing the term by 1 results in fewer parity errors, further decreases by 1 are tested until the best value for the term is determined.

After each term in the sequence $T_3$, $T_2$, $T_1$, $T_0$, $T_1$, $T_2$, $T_3$ has been adjusted at step 310, the best target for the head or head/zone has been identified. This value is stored, together with the tap coefficients of the FIR filter for later use.

At step 312, the method determines whether there are more heads or head/zone pairs to be tested. If there are, the process returns to step 314, and the next head or head/zone pair is selected. Steps 306, 308, and 310 are then repeated for the newly selected head or head/zone pair.

After targets have been identified for all of the heads or head/zone pairs at step 312, the process continues at step 316 where the number of times each target was selected as the best target is counted. The target that is found to have the highest count is then selected as the target for the storage device.

Note that the process of FIG. 3 can be performed using only a portion of the heads or head/zone pairs in a data storage device, all of the heads or head/zone pairs in the device, or all of the heads or head/zone pairs found in multiple devices.

In one embodiment of the invention, the target identified in step 316 is used as a default target for a family of storage devices. In one instance, the present inventor has found that this default target should be $(1-D)(4+6D+2D^2+1D^3)$.

Due to manufacturing variations, however, this default target may not be ideal for an individual head or head/zone pair in a storage device. As such, another aspect of the present invention provides a method for further adjusting the default target to improve performance for a particular head or head/zone within a storage device.

Figure 6:
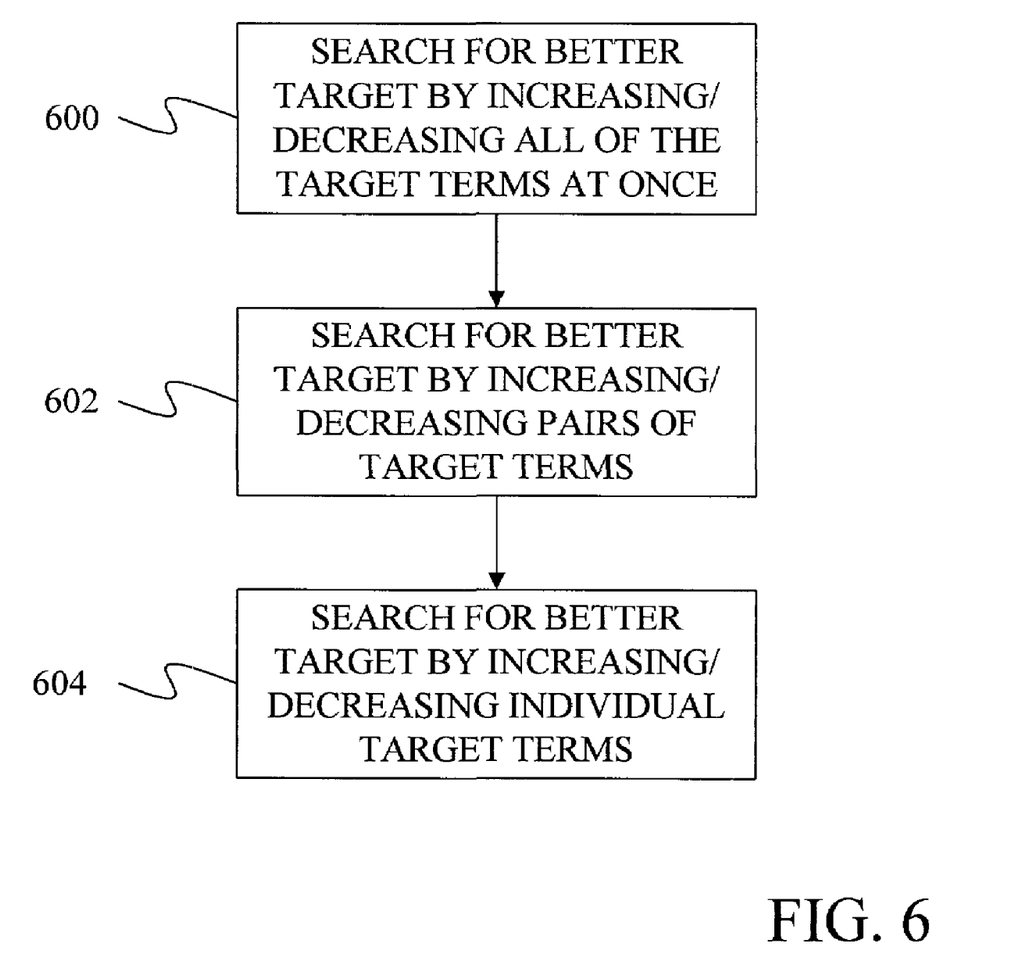
FIG. 6 is a flow diagram of a method of altering an equalization target to improve channel performance.

One method for adjusting the target of a head or head/zone is shown in FIG. 6. At step 600 of FIG. 6, all of the terms of the default target are adjusted at once to see if the target improves. Thus, all four terms, $T_0$, $T_1$, $T_2$, $T_3$, of the default target are first increased by 1 and the new target is then tested using the steps of FIG. 5 to see if the new target improves performance. If the increase improves performance, the terms will continue to be increased until there are no further gains in performance as measured by the number of parity errors. If the initial increase in the target terms does not improve performance, all of the terms are decreased by 1 to form a new target that is then tested using the steps of FIG. 5. If the decrease results in improved performance, the target terms are repeatedly decreased until there are no further improvements in performance.

After step 600, the new target is further adjusted by adjusting pairs of target terms. In one particular embodiment, term pairs in the sequence $(T_2, T_3)$, $(T_1, T_2)$, $(T_0, T_1)$, $(T_1, T_2)$, and $(T_2, T_3)$ are adjusted. During the adjustment of each pair, both terms in the pair are first increased by 1 to form a new target that is then tested using the steps of FIG. 5 to determine if the new target performs better than the current best target. If the increase improves performance, the terms in the pair are again increased until the target no longer improves. The improved target then becomes the current best target. If the initial increase of the terms in a pair does not improve performance, the terms in the pair are decreased by 1 to see if decreasing the terms increases performance.

After each of the term pairs in the sequence $(T_2, T_3)$, $(T_1, T_2)$, $(T_0, T_1)$, $(T_1, T_2)$, and $(T_2, T_3)$ have been adjusted, the process of step 602 ends. Note that other sequences of pairs are within the scope of the present invention and that the sequence of pairs identified above is only one example of sequences contemplated by the present inventor.

After step 602, individual terms in the target are adjusted in step 604. Under one embodiment, the individual term adjustments are similar to those described above for step 310 of FIG. 3.

After step 604, the target has been improved for the selected head or head/zone pair. The process of FIG. 6 can then be repeated for other heads or other head/zone pairs as needed.

In summary, a method of identifying an equalization target for a channel (such as 200) is provided. The method includes measuring a goodness metric (such as in step 504) for a first candidate target by reading data through the channel. A goodness metric is then measured (such as in step 504) for a second candidate target. The goodness metric for the first candidate target is compared to the goodness metric for the second candidate target (such as in step 506) and the candidate target with the better measure of the goodness metric is selected as the equalization target for the channel.

In other embodiments, a data storage device (such as 100) is provided for reading data from a medium (such as 106). The data storage device includes a read head (such as 110) for generating an electrical signal based on data stored on the medium. The storage device also includes a read channel (such as 200) coupled to the read head for equalizing the electrical signal based on an equalization target of $(1-D)(4+6D+2D^2+D^3)$ to produce an equalized signal and for detecting data in the equalized signal.

A further method is provided for forming an equalization target for a channel (such as 200). The method includes searching through a plurality of equalization targets that satisfy a spectral null constraint (such as in step 308) to locate an equalization target that provides a best goodness measure. The located equalization target is then adjusted (such as in steps 310, 600, 602, and/or 604) so that it no longer satisfies the spectral null constraint.

In an additional method of the present invention an equalization target is selected by selecting a spectral null constraint and performing a step for selecting the equalization target by at least initially using the spectral null constraint.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the channel while maintaining substantially the same functionality without departing from the scope and spirit of the present invention. In addition, although the preferred embodiment described herein is directed to a channel for data storage device, it will be appreciated by those skilled in the art that the teachings of the present invention can be applied to other signal devices that have channels and equalization targets, without departing from the scope and spirit of the present invention. In addition, although a first candidate target and a second candidate target have been referred to, it is clear from the description above that the system is capable of ranking any number of candidate targets when attempting to identify an equalization target.

What is claimed is:

1. A method of identifying an equalization target for a channel, the method comprising:
separately identifying an equalization target for each of a set of heads using steps comprising
measuring a goodness metric for a first candidate target by reading data through the channel;
measuring the goodness metric for a second candidate target by reading data through the channel;
comparing the measure of the goodness metric of the first candidate target to the measure of the goodness metric of the second candidate target and selecting the target with the better measure of the goodness metric; and
modifying the selected equalization target to improve the measure of the goodness metric;
counting the number of times each equalization target was identified; and
selecting the equalization target that was identified for the most heads as the equalization target for the channel.

2. The method of claim 1 wherein measuring the goodness metric for the first candidate target comprises:
setting the first candidate target in the channel;
placing an equalizer in the channel into adaptation mode until the equalizer adapts itself to produce equalized data that approaches the first candidate target;
taking the equalizer out of adaptation mode;
using the equalizer to form equalized data; and
measuring the goodness metric based in part on the equalized data.

3. The method of claim 2 wherein measuring the goodness metric based in part on the equalized data comprises:
performing post-processing on the equalized data to form post-processing data; and
measuring the number of parity errors in the post-processing data.

4. The method of claim 1 wherein the first candidate target and the second candidate target are constrained to have a spectral null.

5. The method of claim 4 wherein modifying the selected equalization target for the channel comprises changing the equalization target to form a new target that does not have the spectral null.

6. The method of claim 5 wherein modifying the equalization target for the channel comprises sequentially adjusting single terms in the equalization target for the channel.

7. The method of claim 5 wherein modifying the equalization target for the channel comprises increasing all of the terms in the equalization target for the channel at the same time.

8. The method of claim 7 wherein modifying the equalization target for the channel comprises sequentially changing pairs of terms in the equalization target.

9. The method of claim 1 wherein the identified equalization target for the channel is of the form $(1-D)(4+6D+2D^2+D^3)$.

10. A data storage device for reading data from a medium, the data storage device comprising:
a read head for generating an electrical signal based on data stored on the medium;
a read channel coupled to the read head for equalizing the electrical signal based on an equalization target of $(1+D)(4+6D+2D^2+D^3)$ to produce an equalized signal and for detecting data in the equalized signal.

11. A method of forming an equalization target for a channel, the method comprising:
searching through a plurality of candidate equalization targets that satisfy a spectral null constraint to locate an initial equalization target that provides a best goodness measure; and
adjusting the initial equalization target so that it no longer satisfies the spectral null constraint.

12. The method of claim 11 wherein adjusting the initial equalization target comprises adjusting the initial equalization target so that the goodness measure is improved.

13. The method of claim 12 wherein adjusting the initial equalization target comprises sequentially adjusting a set of terms in the initial equalization target.

14. The method of claim 11 wherein locating an initial equalization target that provides a best goodness measure comprises locating an equalization target that generates the fewest parity errors in the data produced by the channel.

15. The method of claim 14 wherein locating an equalization target that generates the fewest parity errors comprises determining the number of parity errors produced by the channel using a candidate equalization target using steps comprising:
reading data within a track on a medium while the head is offset to one side of track center and determining a first number of parity errors produced by the channel;
reading data within the track on the medium while the head is offset to the other side of track center and determining a second number of parity errors produced by the channel; and
taking into account the first number of parity errors and the second number of parity errors to identify the number of parity errors associated with the candidate equalization target.

16. The method of claim 11 wherein forming an equalization target for a channel further comprises:
for each head in a storage device, separately forming an equalization target;
counting the number of times each equalization target is formed; and
selecting the target that is formed f or the most heads as the equalization target for the channel.

17. The method of claim 11 wherein forming an equalization target for a channel further comprises:
for each head/zone pair in a storage device, separately forming an equalization target;
counting the number of times each equalization target is formed; and selecting the target that is formed for the most head/zone pairs as the equalization target for the channel.

18. A method for selecting an equalization target, the method comprising:
selecting a spectral null constraint;
selecting an initial equalization target from a plurality of equalization targets that satisfy the spectral null constraint; and
adjusting the initial equalization target so that it no longer satisfies the spectral null constraint.

19. The method of claim 18 wherein adjusting the initial equalization target comprises sequentially altering individual terms in the initial equalization target.

* * * * *

UNITED STATES PATENT AND TRADEMARK OFFICE
CERTIFICATE OF CORRECTION

PATENT NO. : 7,184,237 B2 Page 1 of 1
APPLICATION NO. : 10/028067
DATED : February 27, 2007
INVENTOR(S) : Shi It is certified that error appears in the above-identified patent and that said Letters Patent is hereby corrected as shown below:

Column 8, claim 10, line 17:
"(1+D)" should be -- (1-D) --

Column 8, claim 16, line 60:
"f or" should be -- for --

Signed and Sealed this

Fifteenth Day of May, 2007

JON W. DUDAS
*Director of the United States Patent and Trademark Office*